(12) United States Patent
Gibson

(10) Patent No.: US 11,191,257 B1
(45) Date of Patent: Dec. 7, 2021

(54) LANDING NET WITH REMOVABLE INTEGRAL FISH BONKER

(71) Applicant: Roger Gibson, Anchorage, AK (US)

(72) Inventor: Roger Gibson, Anchorage, AK (US)

( * ) Notice: Subject to any disclaimer, the term of this patent is extended or adjusted under 35 U.S.C. 154(b) by 283 days.

(21) Appl. No.: 16/555,114

(22) Filed: Aug. 29, 2019

(51) Int. Cl.
*A01K 75/04* (2006.01)
*A01K 77/00* (2006.01)
*A01K 97/00* (2006.01)

(52) U.S. Cl.
CPC .............. *A01K 75/04* (2013.01); *A01K 77/00* (2013.01); *A01K 97/00* (2013.01)

(58) Field of Classification Search
CPC ........ A01K 75/04; A01K 77/00; A01K 74/00; A01K 75/00; A01K 97/14; A01K 99/00
See application file for complete search history.

(56) References Cited

U.S. PATENT DOCUMENTS

| | | | | |
|---|---|---|---|---|
| 2,757,002 A | * | 7/1956 | Ryden | A01K 97/00 43/4 |
| 6,857,217 B1 | * | 2/2005 | Herbst | A01K 97/14 114/97 |
| 7,624,530 B2 | * | 12/2009 | Resch | A01K 77/00 43/12 |
| 2006/0005452 A1 | * | 1/2006 | McIntyre | A01K 77/00 43/11 |
| 2012/0036758 A1 | * | 2/2012 | Steffens | A01K 77/00 43/12 |

* cited by examiner

*Primary Examiner* — Edward Chang
*Assistant Examiner* — Nicole Paige Maccrate
(74) *Attorney, Agent, or Firm* — Michael J. Tavella

(57) ABSTRACT

A landing net that has an integral bonker installed in its handle. The bonker can be removed as needed to stun a fish. When done, the bonker can be reinstalled in the net's handle for later use. The bonker is designed to fit inside the handle of the net. The bonker has a weighted head, a shaft, a spring-loaded locking button in the shaft, a handle, and an optional lanyard. In use, the user presses the spring-loaded locking button until it is below the height of the handle. The user then can withdraw the bonker and use it to stun a fish. When done, the bonker can be reinserted into the handle of the net, the button can be depressed and the bonker can then be pushed up into place until the spring-loaded locking button pops up to secure the bonker in the handle.

11 Claims, 5 Drawing Sheets

LANDING NET WITH REMOVABLE INTEGRAL FISH BONKER

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to landing nets for fishing and particularly to landing nets for fishing that have removable integral fish bonkers.

2. Description of the Prior Art

Sport fishing has been an activity for centuries. Fish are caught using a variety of rods and reels and from the land or boats. Good anglers carry landing nets to remove their catch from the water. This helps the fish when using catch and release practices and it makes it easier to land fish for keeping. Many landing nets have telescoping handles that are held by spring-loaded buttons that fit into holes made in the net handles. In this way, the handle can be extended for use and then can be retracted for storage and transport.

Another aspect of fishing where the fish are retained, is that of dealing with large fish once they are in the landing net. Larger species such as salmon, for example, are not only heavier, they are hard to control. To that end the fish bonker has been developed. The bonker is a small club that is weighted so that it can deliver a sharp blow to the fish. The blow stuns the fish into submission so that it can be removed from the net and placed in a cooler, for example. Bonkers can be almost anything-sticks or rocks are common, but many times people prefer to use ready-make bonkers, which are usually filled with a weight and have a plastic outer shell.

Often times people carry both the net and the bonker when fishing. The bonker is suspended by a lanyard. Although the bonker is there, it is hard to use and tends to get in the way of the fisherperson. Many times, though the bonkers get left on the shore away from the present fishing site, which is an inconvenience.

Presently, there is no easy way to carry a net and a bonker effectively. FIG. 1 shows a typical landing net 100 as prior art. The net 100 has a head 101 that holds a net 102. The head is attached to an inner handle 103 (dashed lines). The outer handle 104 is typically sealed with an end cap 105. A button 106 sticks out of a hole in the outer net as shown. It is spring-loaded. To extend the net, the button 106 is pushed down under the outer handle until the button can be captured by the outer handle and restrained. The inner handle 103 can then be extended until the button 103 aligns with the hole 107 at the top of the outer handle and can then spring up out of the hole 107 to secure the two handles together.

BRIEF DESCRIPTION OF THE INVENTION

The instant invention overcomes the difficulties described above. It is a landing net that has an integral bonker installed in its handle. The bonker can be removed as needed to stun a fish. When done, the bonker can be reinstalled in the net's handle for later use. The bonker is designed to fit inside the handle of the net. The bonker has a weighted head, a shaft, a spring-loaded locking button in the shaft, a handle, and an optional lanyard. In use, the user presses the spring-loaded locking button until it is below the height of the handle. The user then can withdraw the bonker and use it to stun a fish. When done, the bonker can be reinserted into the handle of the net, the button can be depressed and the bonker can then be pushed up into place until the spring-loaded locking button pops up to secure the bonker in the handle.

DETAILED DESCRIPTION OF THE INVENTION

Figure 1:
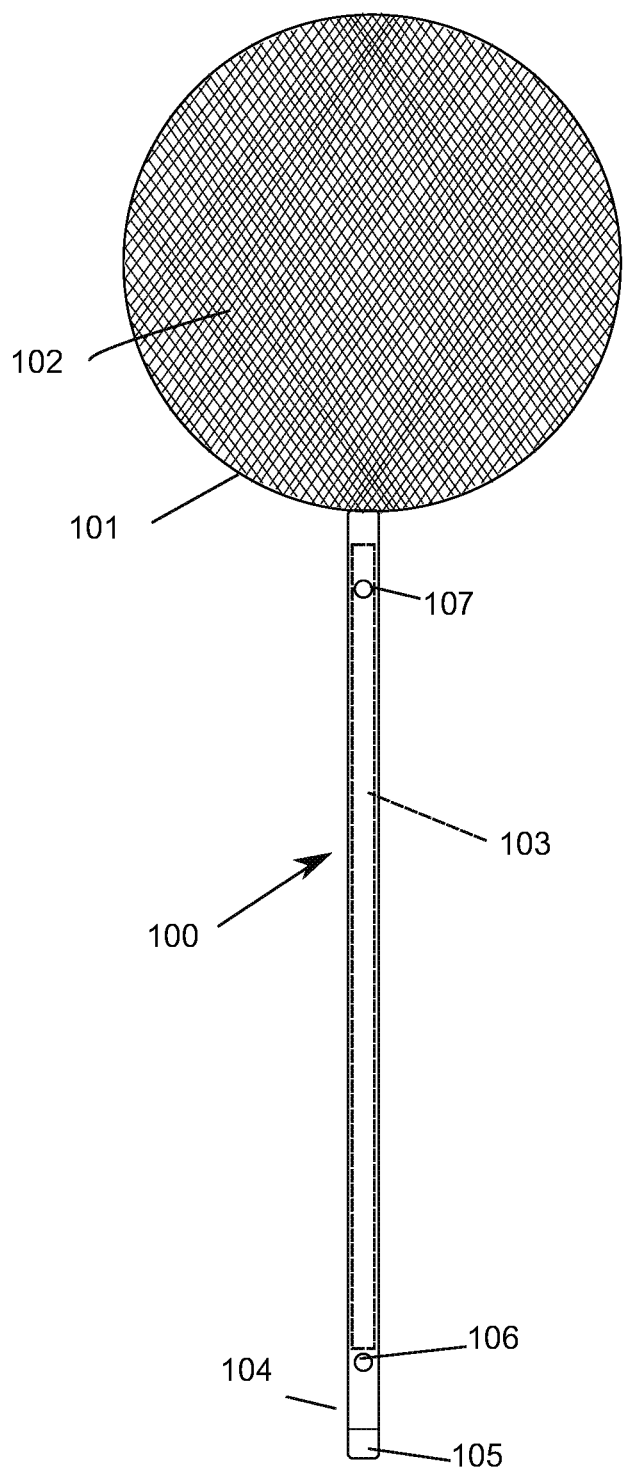
FIG. 1 is a front view of a landing net as prior art.
Figure 2:
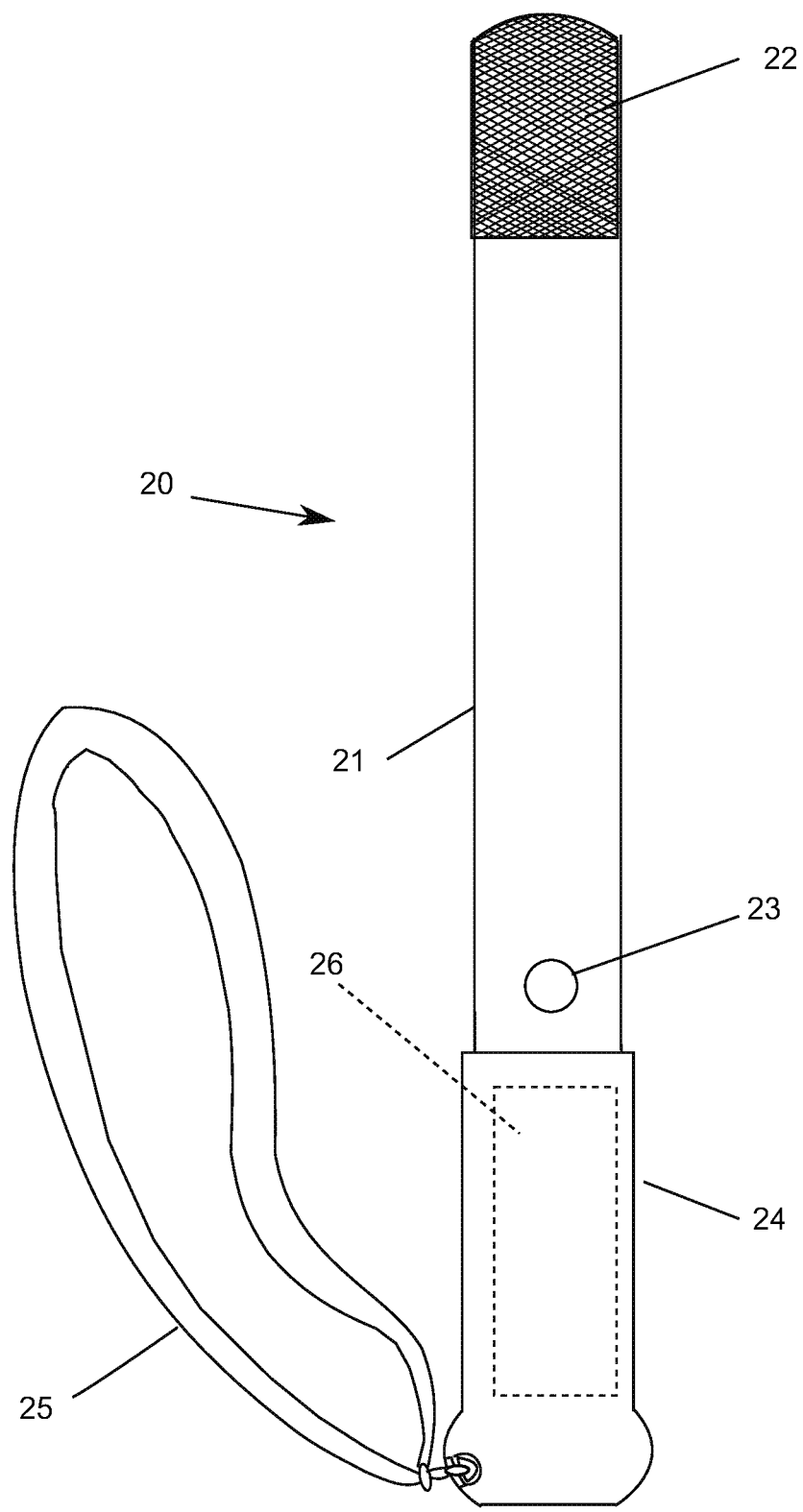
FIG. 2 is a detail view of the removable bonker.
Figure 3:
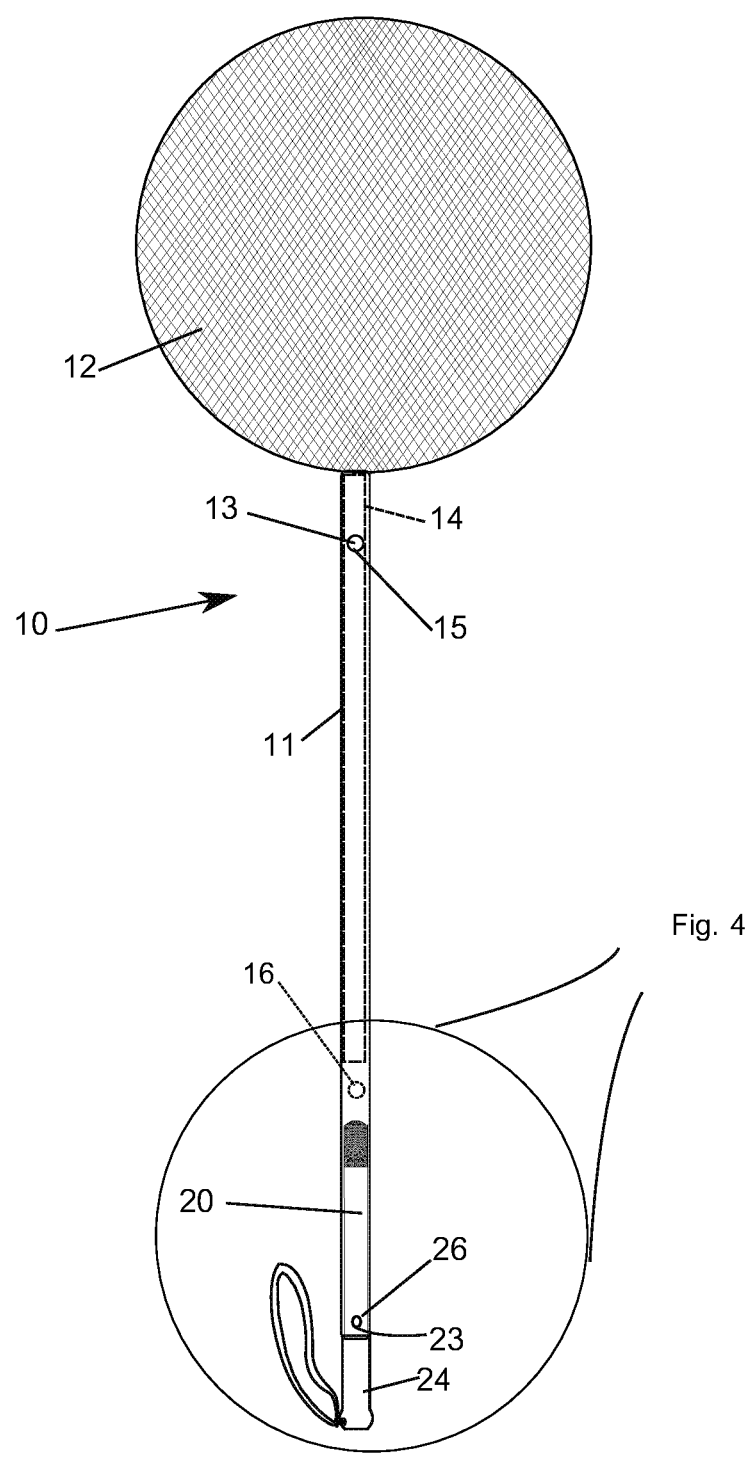
FIG. 3 is a front view of a landing net with the bonker installed.
Figure 4:
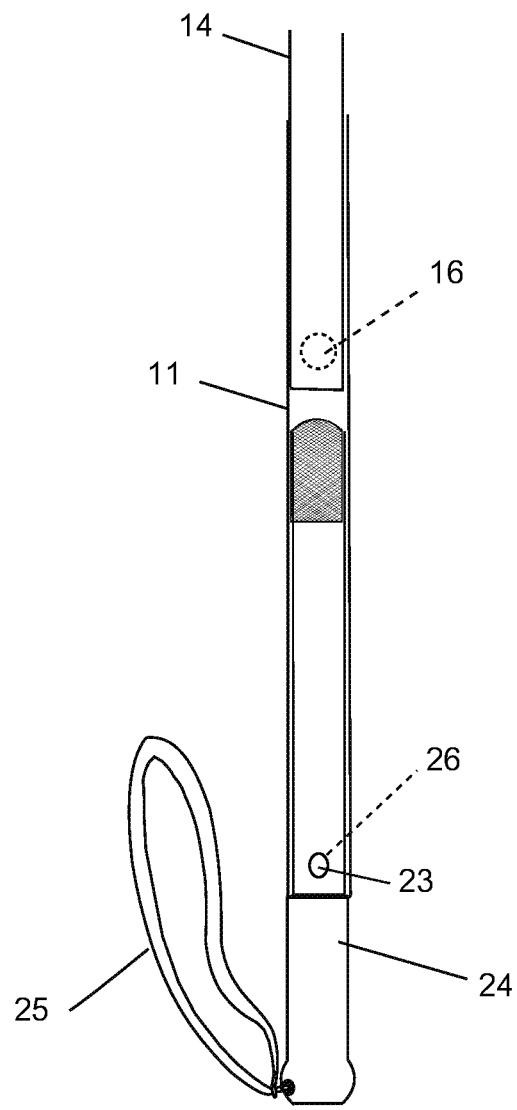
FIG. 4 is a detail view of the bonker installed in the handle of the net.

Referring now to the drawings and particularly FIGS. 2-4, FIG. 2 is a detail view of the removable bonker 20. The bonker 20 has a shaft portion 21 that has a weighted top 22 at the distal end, and a spring-loaded button 23 installed as shown. At the proximate end of the shaft portion 21 is a grip 24. The grip has an optional lanyard 25 as shown.

As an option, the bonker can be made floatable by adding buoyancy into the handle of the bonker. This can be done by placing a piece of light weight foam, or similar material 26 into the handle. In this way, the handle portion will float on the surface while the weighted portion remains below the surface.

FIG. 3 is a front view of a landing net with the bonker installed, which constitutes the invention 10. In this view, the bonker 20 is installed in the outer handle 11. The net 12 is attached to an inner handle 14 using normal fasteners. Note that the handle 11 can be telescoping. In that case, a spring-loaded button 13 is installed in the inner handle 14. Note that the button protrudes through the outer handle at first locking hole 15. To expand the handle, the button 13 is pushed in, freeing the outer handle. The outer handle 11 can then be pulled downward until a second button 16 aligns with the upper hole 15 in the outer handle 11. At that point, the handle is then locked in its elongated form. Note that when the net handles are in the retracted position, button 16 is retracted and held within the inner handle by the outer handle. In a similar manner, the bonker 20 is held in the outer handle 11. by button 23.

FIG. 4 is a detail view of the bonker installed in the handle of the net. This view is an enlarged view of The bottom of FIG. 3. Here, the inner handle 14 is shown within the outer handle 11. Note the second button 16 in dashed lines. The bonker 20 secured in the outer handle 11 by button 23 which engages the second locking hole 26 As shown, the grip 24 of the bonker 20 is shown outside of the handle 11. that allows the grip 24 to be used to remove the bonker from the outer handle 11 but also to be used as a grip for the entire handle when using the net.

In use, the user grasps the grip, presses the button 23, and slides the bonker from the net handle 11. The user can then use the bonker 20 to stun a fish, after which, the bonker 20 can be replaced into the handle for storage.

Figure 5:
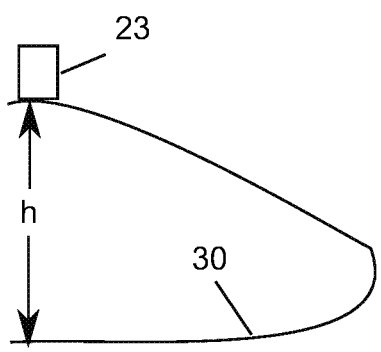
FIG. 5 is a side detail view of the spring-loaded button.

FIG. 5 is a side detail view of a spring-loaded button. Here, a curved spring 30 is shown. The spring 30 has a flattened top section that holds a button, for example button 23. In practice, the height h of the spring 30 is greater than that of the inside diameter d of the body to which it is installed, such as the diameter of the bonker shaft 21 (see FIG. 6).

Figure 6:
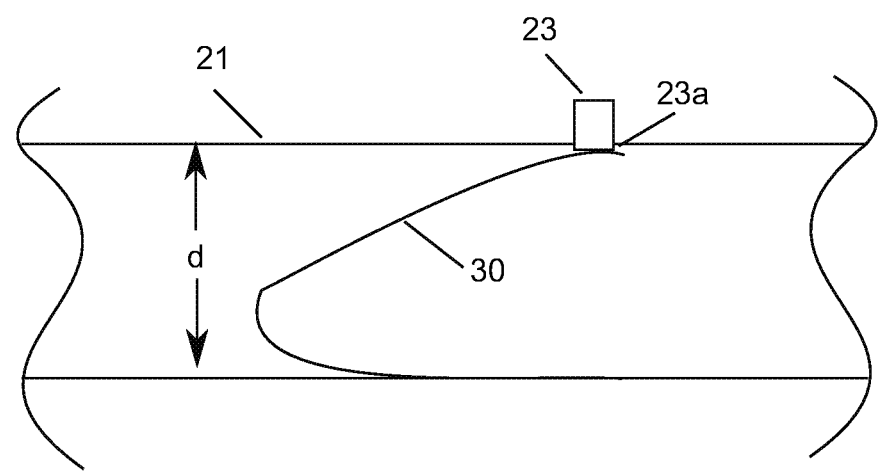
FIG. 6 is a cutaway view of the bonker shaft showing the spring-loaded button installed.

FIG. 6 is a cutaway view of the bonker shaft showing the spring-loaded button installed. As shown, the spring 30 is compressed to where the spring and button 30 and 23 can fit within the diameter d of the shaft portion of the bonker, or any other particular tube, such as the inner handle 14. The spring 30 is then pushed inside of the shaft 21 until it aligns with hole 23a in the shaft 21. At that point, the spring forces the button 23 up through the shaft 21 until it is fully extended, as shown. The spring is under compression at all times so that it holds the button securely in position. To install the bonker 20 in the outer handle 11, the button 23 is compressed below the shaft 21, which allows the handle 11 to slide over it. Note that the other spring loaded buttons work the same way.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A landing net with removable integral fish bonker comprising:
   a) a net having a frame;
   b) a hollow handle having a proximate end and a distal end and wherein said distal end of said hollow handle being attached to said frame and further wherein said proximate end is open, said hollow handle further having a locking hole formed therein near said proximate end;
   c) a fish bonker having a grip, a shaft and a weighted tip, said fish bonker being sized to fit within said hollow handle; said fish bonker also having a spring-loaded button attached thereto, whereby said spring loaded button extends upward from said shaft of said fish bonker;
   d) and further wherein said fish bonker is stored within said proximate end of said hollow handle and further wherein said fish bonker is removed from said hollow handle for use in striking a fish.

2. A landing net with removable integral fish bonker comprising:
   a) a net having a frame;
   b) an inner handle attached to said net, said inner handle having a distal end and a proximate end, said inner handle also having a first spring-loaded button installed in said distal end such that said spring loaded button extends upward from said inner handle, and a second spring-loaded button installed in the proximate end of said inner handle such that said spring loaded button extends upward from said inner handle;
   c) a hollow handle having a proximate end and a distal end, said hollow handle being slidably placed over said inner handle, said hollow handle having a distal end and a proximate end, said hollow handle also having a first locking hole formed in the distal end of said hollow handle and a second locking hole formed in the proximate end of said hollow handle, and further said proximate end of said hollow handle has an open end;
   d) a fish bonker having a grip, a shaft and a weighted tip, said fish bonker being sized to fit within said hollow handle; said fish bonker also having a spring-loaded button attached thereto, whereby said spring loaded button extends upward from said shaft of said fish bonker;
   e) and further wherein said fish bonker is stored within said proximate end of said hollow handle and further wherein said fish bonker is removed from said hollow handle for use in striking a fish.

3. The landing net with removable integral fish bonker of claim 2 wherein said hollow handle has a first position in which said hollow handle is held by said first spring loaded button in said inner handle, and a second position in which said hollow handle is held by said second spring loaded button in said inner handle.

4. The landing net with removable integral fish bonker of claim 1 further comprising a lanyard attached to said grip.

5. The landing net with removable integral fish bonker of claim 2 further comprising a lanyard attached to said grip.

6. The landing net with removable integral fish bonker of claim 1 where the handle of the fish bonker can float.

7. The landing net with removable integral fish bonker of claim 2 where the handle of the fish bonker can float.

8. The landing net with removable integral fish bonker of claim 1 wherein the handle of the fish bonker contains a buoyancy aid.

9. The landing net with removable integral fish bonker of claim 2 wherein the handle of the fish bonker contains a buoyancy aid.

10. The landing net with removable integral fish bonker of claim 8 wherein the buoyancy aid is a lightweight foam.

11. The landing net with removable integral fish bonker of claim 9 wherein the buoyancy aid is a lightweight foam.

* * * * *